United States Patent [19]

Carr

[11] 3,794,929
[45] Feb. 26, 1974

[54] COMPACT LASER AMPLIFIER SYSTEM
[75] Inventor: Ronald B. Carr, Livermore, Calif.
[73] Assignee: The United States of America as represented by the United States Atomic Energy Commission, Washington, D.C.
[22] Filed: Oct. 13, 1972
[21] Appl. No.: 297,537

[52] U.S. Cl. .................. 330/4.3, 331/94.5, 356/5, 350/310
[51] Int. Cl. ............................................. H01s 3/02
[58] Field of Search ..... 331/94.5 R; 330/4.3; 356/5; 350/310

[56] References Cited
UNITED STATES PATENTS

| | | | |
|---|---|---|---|
| 3,241,085 | 3/1966 | Marcatili | 331/94.5 |
| 3,423,693 | 1/1969 | Chernoch et al. | 331/94.5 |
| 3,423,691 | 1/1969 | Chernoch et al. | 331/94.5 |
| 3,513,402 | 5/1970 | Marrison | 330/4.3 |
| 3,731,103 | 5/1973 | O'Meara | 356/5 |

Primary Examiner—Maynard R. Wilbur
Assistant Examiner—N. Moskowitz
Attorney, Agent, or Firm—John A. Horan; F. A. Robertson; L. E. Carnahan

[57] ABSTRACT

A compact laser amplifier system in which a plurality of face-pumped annular disks, aligned along a common axis, independently radially amplify a stimulating light pulse. Partially reflective or lasing means, coaxially positioned at the center of each annular disk, radially deflects a stimulating light directed down the common axis uniformly into each disk for amplification, such that the light is amplified by the disks in a parallel manner. Circumferential reflecting means coaxially disposed around each disk directs amplified light emission, either toward a common point or in a common direction.

8 Claims, 1 Drawing Figure

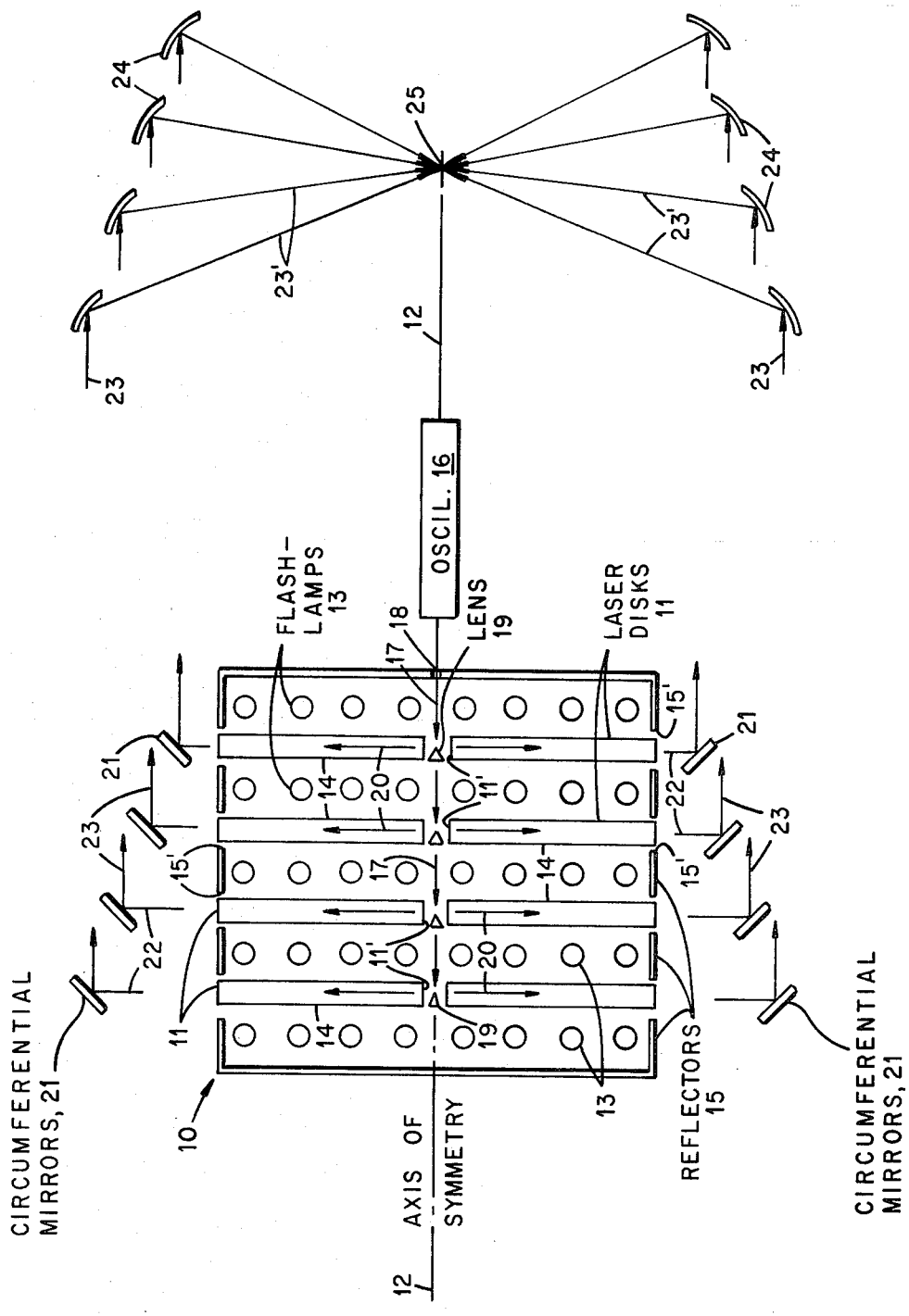

COMPACT LASER AMPLIFIER SYSTEM

BACKGROUND OF THE INVENTION

The invention described herein was made in the course of, or under, Contract No. W-7405-ENG-48, with the United States Atomic Energy Commission.

This invention relates to laser amplifiers, and more particularly to a compact disk laser amplifier system wherein the light is amplified by the disks in a parallel manner.

A high energy laser light pulse is commonly obtained by series-amplification of a lower energy light pulse. Prior known laser amplification systems typically comprise an oscillator element for generating a low energy light pulse, and a chain of amplifier elements for successively amplifying that pulse. The intensity (energy/unit area) of an amplified light pulse in such chain light amplification systems cannot exceed the damage threshold of the optical components of the system. The typical method for preventing the amplified light pulse from reaching a damaging intensity in such systems is to expand both the cross sectional area of the beam and of the optical component as the beam is amplified.

However, increasing the cross sectional area of both the beam and the optical components does not preclude formation of "hot spots" having sufficient energy to damage the optical component. Such "hot spots" are usually due to self-focusing and related phenomena in the active material of the system. Moreover, such chain light amplification systems are not compact and thus require a substantial amount of room to house same.

SUMMARY OF THE INVENTION

The present invention overcomes the above-mentioned problems of the prior art laser amplification system by providing a compact disk laser amplifier system, wherein a plurality of face-pumped annular disks radially amplify a light pulse in parallel, rather than in series.

The inventive laser amplifier has the following advantages over prior known amplification systems: (1) the cross sectional area of the amplified light beam and the active laser material inherently increase as the stimulating light propagates radially outward through each disk; (2) amplifies a stimulating light pulse in parallel rather than in series; (3) the danger due to self-focusing and related phenomena is minimized; and (4) the system is compact. Also, the resulting annular beams allow for focusing from all directions.

Therefore, it is an object of this invention to provide a laser light amplification system.

A further object of the invention is to provide a laser amplification system which amplifies a light pulse in parallel, rather than in series.

Another object of the invention is to provide a compact laser amplifier system.

Another object of the invention is to provide a compact laser amplifier system in which a plurality of face-pumped annular disks, aligned along a common axis, independently radially amplify a stimulating light pulse.

Other objects of the invention not specifically set forth above will become apparent from the following description and accompanying drawing.

BRIEF DESCRIPTION OF THE DRAWING

The single FIGURE is a schematic illustration of an embodiment of the inventive laser amplifier system.

DESCRIPTION OF THE INVENTION

The invention is a compact disk laser amplification system, wherein a plurality of face-pumped annular disks radially amplify a light pulse in parallel, rather than in series.

Referring now to the drawing, an embodiment of the invention is shown wherein a disk/flashlamp assembly 10 comprises a plurality of annular disks 11 (four shown in this embodiment) of a laser material, such as neodymium glass, and having central openings or apertures 11' are aligned along an axis of symmetry indicated at 12. Flashlamps such as conventional xenon units connected to an appropriate power supply, indicated at 13, positioned between the disk faces 14, optically pump the active lasing material. A reflector housing 15 encloses the annular disk/flashlamp assembly 10 to direct maximum light from flashlamps 13 onto the faces of disks 11. Housing 15 is provided with openings 15' adjacent the periphery of disks 11. A laser oscillator 16 positioned on the axis of symmetry 12 directs a stimulating light pulse indicated by arrows 17 along axis 12 through a central opening 18 in reflective housing 15 into the annular disk/flashlamp assembly 10. A plurality of cone-shaped partially reflective members 19 are positioned in the central opening 11' of each disk 11 to deflect a portion of the oscillator light pulse 17 uniformly and radially into each associated disk 11 as indicated by arrows 20 whereby the light is amplified as it propagates radially out through the disks, while allowing the remainder of the light pulse 17 to pass to the next member 19. Circumferential mirrors or reflectors 21, of differing radius, direct the amplified emissions, as indicated at 22, stimulated by the oscillator pulse from each disk 11 in annular parallel beams 23 coaxially back along the axis of symmetry 12. A plurality of annular secondary reflective surfaces 24, of differing radius, intercept the annular beams 23 and direct them, as indicated by arrows 23' to a common focal point 25 on the axis of symmetry 12 for utilization or to be directed by appropriate optics, not shown, to a point of utilization. By adjustment of the distance between the respective circumferential mirrors 21 and the secondary reflective surfaces 24, the optical path length from the oscillator 16 through each disk 11 to the common focal point 25 are identical. Accordingly, the stimulated, amplified, emission light (beams 23—23') from each disk 11 arrives simultaneously at the focal point 25.

The inventive disk laser light amplification system has the following advantages over conventional laser amplification systems:

1. The cross sectional area of the amplified light beam and the active laser material inherently increase as the stimulating light propagates radially outward through each disk. Accordingly, the intensity of the amplified light will never reach the damaged threshold of the laser material by properly optimizing the pump energy and oscillator pulse energy to the ratio of the inner diameter to the outer diameter of the annular disk.

2. The laser system amplifies a stimulating light pulse in parallel rather than in series. Accordingly, failure of one optical component (for example, disks, lens, or mirror) does not cause the entire system to fail. Moreover, backward reflection in the system is not as serious as in conventional chain laser amplification systems.

3. Danger due to self-focusing and related phenomena is minimized, since the stimulating light pulse is amplified as it propagates radially outward through the disk in a cylindrically expanding wave.

4. The disk laser system is compact.

In addition, the resulting annular beams allow focusing from all directions.

It has thus been shown that the inventive compact disk laser amplifying system distinguishes from the prior known disk laser systems in that (1) the light is amplified as it propagates radially out through the disks; and (2) the light is not serially amplified by the disks, but is amplified in parallel. Thus the laser amplifier system or this invention provides a substantial advance in the art.

While a particular embodiment of the invention has been illustrated and described, modifications will become apparent to those skilled in the art, and it is intended to cover all such modifications as come within the true spirit and scope of the invention.

What I claim is:

1. A compact laser amplifier system comprising: a plurality of spaced face-pumped disk means of lasing material aligned along an axis of symmetry, a plurality of flashlamp means positioned adjacent each face of each of said disk means, reflective housing means positioned around said disk means and said flashlamp means and provided with a central opening and a plurality of peripheral openings adjacent said disk means, said plurality of disk means each being provided with a central aperture therethrough, a partially reflective cone-shaped member positioned in each of said central aperture of each of said disk means, laser oscillator means positioned to direct a stimulating light pulse along said axis of symmetry, through said central opening in said housing means and through said central apertures of said disk means whereby said partially reflective cone-shaped members each deflect a portion of the light pulse radially and uniformly into each of said disk means wherein each portion of said light pulse is amplified as it passes radially outwardly through said disk means, circumferential mirror means positioned about said housing means for directing the amplified light emissions from said disk means in parallel beams coaxial with said axis of symmetry, and reflector means positioned to intercept said annular beams and direct same to a common focal point.

2. The laser amplifier system defined in claim 1, wherein each of said plurality of disk means is of an annular configuration.

3. The laser amplifier system defined in claim 2, wherein each of said annular disk means is constructed of neodymium glass, and wherein each of said plurality of flashlamps is of the xenon type.

4. The laser amplifier system defined in claim 1, wherein said circumferential mirror means comprises a plurality circumferential mirrors each being of a different radius.

5. The laser amplifier system defined in claim 4, wherein said reflector means comprises a plurality of reflectors each being of a different radius, the radius of each of said reflectors being substantially the same as the radius of a corresponding circumferential mirror.

6. The laser amplifier system defined in claim 1, wherein said reflector means comprises a plurality of reflectors each being of a different radius.

7. The laser amplifier system defined in claim 1 wherein said common focal point is on said axis of symmetry.

8. The laser amplifier system defined in claim 1, wherein said reflector means is positioned with respect to said circumferential mirror means such that optical path lengths from said oscillator means through each of said disk means to said common focal point are identical, whereby the amplified stimulated emission light from each disk means arrives simultaneously at the focal point.

* * * * *